United States Patent
Neal et al.

(10) Patent No.: US 6,237,057 B1
(45) Date of Patent: May 22, 2001

(54) METHOD AND SYSTEM FOR PCI SLOT EXPANSION VIA ELECTRICAL ISOLATION

(75) Inventors: Dan Marvin Neal, Round Rock, TX (US); Richard Allen Kelley, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,057

(22) Filed: Dec. 16, 1998

(51) Int. Cl.[7] ........................................... G06F 13/00
(52) U.S. Cl. ........................... 710/129; 710/128; 710/103
(58) Field of Search ................................ 710/101–103, 710/110, 113, 115, 116, 120, 240, 8, 10, 129, 62–63, 128, 126

(56) References Cited

U.S. PATENT DOCUMENTS 5,784,576 * 7/1998 Guthrie et al. ................... 710/103
5,793,987 * 8/1998 Quackenbush et al. ............ 710/100
6,035,355 * 3/2000 Kelley et al. ..................... 710/101

* cited by examiner

*Primary Examiner*—Robert Beausoleil
*Assistant Examiner*—Raymond N Phan
(74) *Attorney, Agent, or Firm*—Leslie A. VanLeeuwen; Felsman, Bradley, Vaden, Gunter & Dillon, LLP

(57) ABSTRACT

A method of providing an interconnection between one or more peripheral devices and a system bus of a computer system selectively establishes and removes a connection from a primary peripheral bus to a secondary peripheral buses, and determines a target from among the one or more peripheral devices when a bus bridge is a master of the primary peripheral bus, using an address decoder. Access to and from the primary peripheral bus is controlled using an arbiter to select a master for the primary peripheral bus from among the one or more peripheral devices, to allow both (i) selective establishing and removing of a connection from the primary peripheral bus to one of the secondary peripheral buses in response to the selection of the master, and (ii) isolating of the master prior to establishing the connection to the secondary peripheral bus.

21 Claims, 5 Drawing Sheets

METHOD AND SYSTEM FOR PCI SLOT EXPANSION VIA ELECTRICAL ISOLATION

BACKGROUND OF THE INVENTION

1. Field of the Invention

The present invention generally relates to computer systems, specifically to a method and apparatus for interconnecting various computer components (i.e., peripheral devices), and more particularly to a method and system that provides for "hot plugging" of adapter cards while increasing the load and expansion capabilities of the bus for such systems.

2. Description of Related Art

A typical structure for a conventional computer system includes one or more processing units connected to a system memory device (random access memory or RAM) and to various peripheral, or input/output (I/O), devices such as a display monitor, a keyboard, a graphical pointer (mouse), and a permanent storage device (hard disk). The system memory device is used by a processing unit in carrying out program instructions, and stores those instructions as well as data values that are fed to or generated by the programs. A processing unit communicates with the other components by various means, including one or more interconnects (buses), or direct access channels. A computer system may have many additional components, such as serial and parallel ports for connection to, e.g., printers, and network adapters. Other components might further be used in conjunction with the foregoing; for example, a display adapter might be used to control a video display monitor, a memory controller can be used to access the system memory, etc.

Several different bus designs have been developed for interconnecting the various computer components. The original personal computer (PCs) introduced by International Business Machines Corp. (IBM—assignee of the present invention) used an "expansion" bus referred to as the XT bus, which allowed a user to add various optional devices, such as additional memory (RAM), sound cards, telephone modems, etc. This early design was improved upon by adding more data and address lines, new interrupt lines, and direct memory-access (DMA) control lines, to create the well-known AT bus, which is also referred to as the Industry Standard Architecture (ISA) bus. The AT design allowed the microprocessor to run at a faster speed than the expansion bus. A 32-bit extension to this bus was later created, which is referred to as the Extended Industry Standard Architecture (EISA). Another 32-bit expansion bus developed by IBM is the Microchannel Architecture (MCA) bus.

In addition to the foregoing designs, several other bus designs have been developed allowing the use of a system bus which interconnects the processor and the system memory device(s), along with a separate, local bus which interconnects the peripheral devices to the system bus (using a bus bridge). Two well-known standards are the Video Electronics Standards Association (VL) bus, and the Peripheral Component Interconnect (PCI) bus. A computer system using this PCI bus includes, in addition to the physical PCI bus, a PCI host bridge circuit (PCI controller) which controls the transfer of data among the PCI bus, the central processing unit, and main memory. The PCI host bridge circuit is arranged to control the transfer of data between the primary PCI bus and the system bus.

A PCI controller exchanges data with the microprocessor either 32 bits or 64 bits at a time, depending on the implementation, and allows certain "intelligent" PCI-compliant adapters to perform tasks concurrently with the microprocessor, using a technique called bus mastering. The PCI specification also allows for multiplexing, a technique that permits the A/D lines to transmit both address and data information on the same bus lines. An expansion bus controller for a system's ISA, EISA, or MCA slots can optionally be installed as well, providing increased synchronization for all of the system's bus-installed resources.

The PCI local bus specification, version 2.1, defines the electrical characteristics of the PCI bus. Specifically, a bus loading of ten loads is allowed (with the assumed capacitive loading, allowed timing budget, and bus timing definitions). Loads are calculated as follows: (1) each device that is physically soldered to the bus counts as a single load; and (2) each expansion slot coupled to the bus counts as two loads. Conformance to the maximum loading requirements, as indicated above, results in a maximum number of four slots (8 loads) with the remaining two loads for soldered components such as a host bridge.

In earlier computer systems, all of the peripheral components had to be connected (inserted in the PCI or ISA slots) at the time that the computer was first turned on, in order to properly register (initialize) the devices with the computer's operating system. These devices are checked during the system's power-on self test (POST), which includes a set of routines stored in the systems read-only memory (ROM) or firmware (also referred to as read-only storage, or ROS) that test the peripherals to see if they are properly connected and accompanied by a diagnostic numeric value, to the standard output device or standard error device (usually the display screen).

In the earlier systems, if a device were simply not present on the bus during the POST, then it would not be recognized if it was later inserted in a slot (while the computer was still running). In addition, the PCI local bus specification makes no provision for allowing cards to be inserted into a powered bus slot. Instead, those systems were required to be "rebooted" in order to be able to communicate with and utilize the later-added devices. "Rebooting" refers to the restarting of a computer system by reloading its most basic program instructions, viz., the operating system. A system can be rebooted using the software itself (a warm boot) or by actuating the system's hardware, i.e., the reset or power buttons (a cold boot). After rebooting, the new device can be identified using various techniques.

More recent computer systems have the ability to recognize devices which are added to a bus while the computer is operating, that is, without having to reboot the system. One example is the "plug and play" specification, which allows a PC to configure itself automatically to work with peripherals. A user can "plug" in a peripheral and "play" it without manually configuring the system. Plug and play operation requires both ROM that supports the specification, and a special expansion card. While this approach allows the system to recognize a newly added device, it is still often necessary to reset the system in order to properly initialize the device with the operating system. A further improvement in this area is the "hot-plug" specification, wherein separate reset lines and other features are provided for each peripheral device, such that a device can be initialized with the operating system without requiring the entire system to be rebooted (this ability of the device/system is referred to as "hot-pluggable").

Oftentimes, users want to access more than four devices in the expansion slots, but the number of PCI devices that can be used concurrently on a PCI bus is still limited to the four available slots, even with hot plugging. It would, therefore, be desirable to provide a method and system that would increase the maximum number of slots or soldered components that could be coupled to the bus, while conforming to the maximum loading requirements thereof. It would also be advantageous to provide such a method and system that allows the removal and insertion of PCI adapter cards without powering down the system, while allowing the rest of the PCI adapters to remain operational, in an expanded slot environment. It would be further advantageous to provide an enhanced arbiter to support both increasing the number of slots supportable and also supporting the removal and insertion of PCI adapter cards without powering down the system.

SUMMARY OF THE INVENTION

It is therefore one object of the present invention to provide an improved computer system having an expansion bus which allows the addition of peripheral devices to the system.

It is another object of the present invention to provide such an expansion bus which may be used to connect a large number of peripheral devices to the remainder of the computer system, and to each other.

It is yet another object of the present invention to provide an enhanced arbiter allowing insertion and removal of PCI adapter cards on the expansion bus while allowing the rest of the system and I/O subsystem to remain powered and operational.

The foregoing objects are achieved in a method of providing an interconnection between one or more peripheral devices and a system bus of a computer system, generally comprising the steps of connecting a bridge to the system bus, connecting a primary peripheral bus to the bridge, connecting one or more peripheral devices to one or more of a plurality of secondary peripheral buses, selectively establishing and removing a connection from the primary peripheral bus to one of the secondary peripheral buses, and determining a target from among the one or more peripheral devices when the bridge is a master of the primary peripheral bus using an address decoder. Access to and from the primary peripheral bus can be controlled using an enhanced arbiter to select a master for the primary peripheral bus from among the one or more peripheral devices, to allow both (i) selective establishing and removing of a connection from the primary peripheral bus to one of the secondary peripheral bus segments in response to the selection of the master, and (ii) isolating of the master prior to executing a hot plug action. For peer-to-peer communications, transactions may be handled using the bridge as an agent.

Bus switch control logic is utilized to connect the target to be selected to the appropriate secondary peripheral bus segment. The bus switch control logic opens at least one switch to another one of the secondary peripheral buses that is not connected to the target, and closes a switch to the secondary peripheral bus that is connected to the target using the bus switch control logic. A peripheral device on the other one of the secondary peripheral buses detects removal of a request grant signal, and then concludes its data transfer operation.

The peripheral device may be connected to one of the secondary peripheral buses by inserting the peripheral device into the slot. Means are provided to isolate the slot from the secondary peripheral bus before inserting the device, and for applying a reset signal to the slot and initializing the peripheral device following release of the reset signal.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
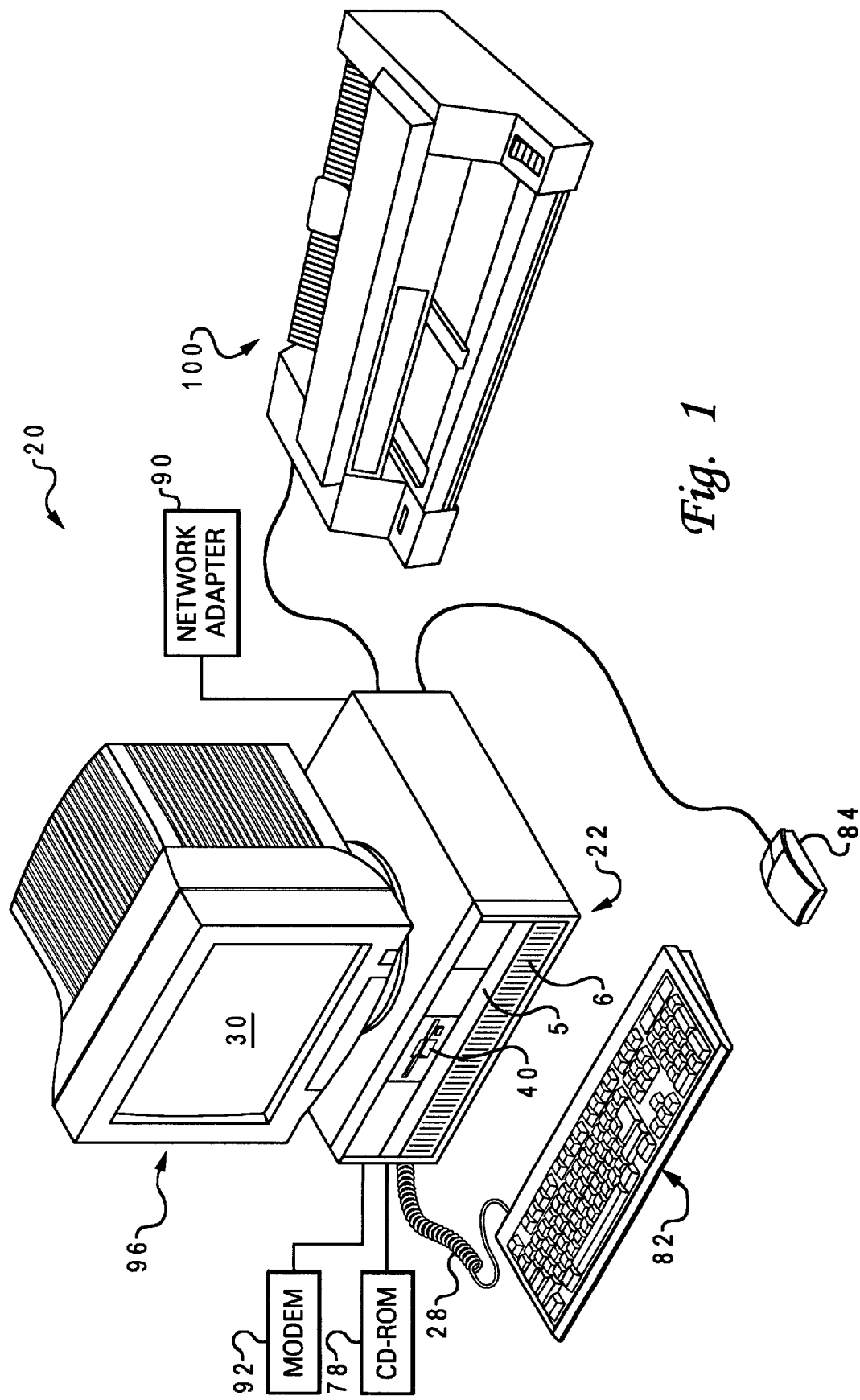
FIG. 1 is a perspective view of data processing system in which the present invention may be implemented.

With reference now to the figures, and in particular with reference to FIG. 1, a data processing system 20 is shown in which the present invention can be implemented. The data processing system 20 includes processor 22, keyboard 82, and display 96. Keyboard 82 is coupled to processor 22 by a cable 28. Display 96 includes display screen 30, which may be implemented using a cathode ray tube (CRT), a liquid crystal display (LCD), an electroluminescent panel, or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such as modern 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using any one of several known off-the-shelf components.

Figure 2:
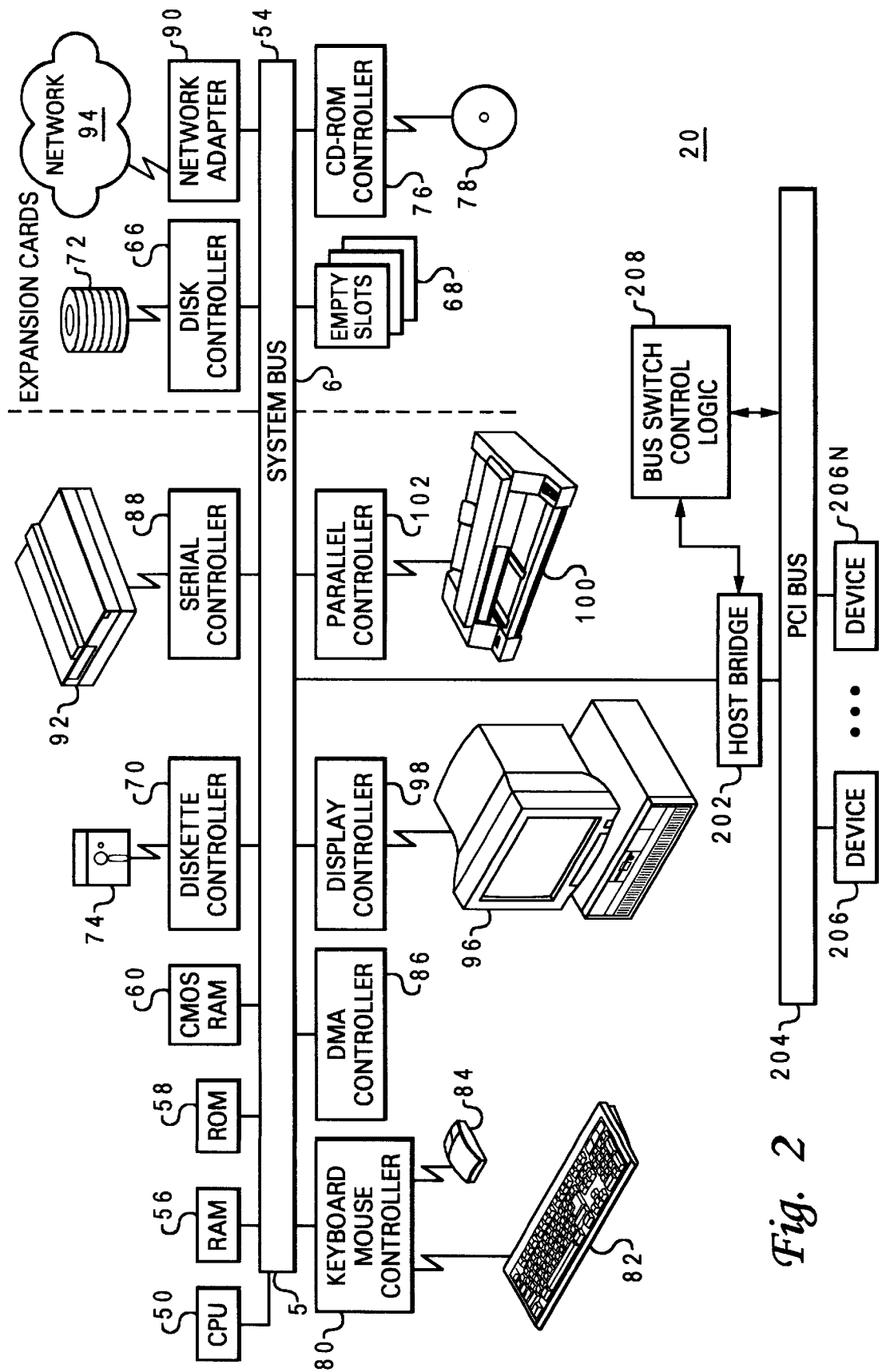
FIG. 2 is a block diagram illustrating selected components that can be included in the data processing system of FIG. 1 according to the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the central processing unit (CPU) 50 to cause data processing system 20 to do work.

Memory devices coupled to system bus 5 include random access memory (RAM) 56, read only memory (ROM) 58, and non-volatile memory 60. Such memories include circuitry that allows information to be stored and retrieved. ROMs contain stored data that cannot be modified. Data stored in RAM can be changed by CPU 50 or other hardware devices. Non-volatile memory is memory that does not loose data when power is removed from it. Non-volatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning read/write head, mediating between the drive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the trackball, the trackpad, and the pointing device sold under the trademark "TrackPoint" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that may be downloaded into data processing system 20 via modem 92. Modem 92 may provide a connection to other sources of software, such as server, an electronic bulletin board, and the Internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other type of printers may include an image setter, a plotter, or a film recorder.

Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2.

As shown in FIG. 2, system bus 5 is connected to a PCI host bridge 202 for communication with PCI bus 204. PCI bus 204 is used for devices 206–206N which require fast communication response times. It should be noted, and those of ordinary skill in the relevant art will readily recognize, that although many of devices are connected to system bus 5, any one of these devices could alternatively be connected to the PCI bus 204 (or PCI buses), or a standard expansion bus (e.g. ISA or EISA). For example, an additional bridge circuit could be attached to the system bus 5 or primary PCI bus 204 to create a standard expansion bus for connection of the devices.

Host bridge 202 facilitates communication between PCI bus 204 and system bus 5. Devices 206–206N are coupled to PCI bus 204. Bus switch control logic 208 is coupled to host bridge 202 and PCI bus 204, and provides control over the PCI bus 204 for increased loading thereof, and provides control over the PCI bus 204 for insertion and removal of PCI adapter cards while allowing the system and the rest of the PCI I/O subsystem to remain powered and operational. More specifically, the load capabilities of PCI bus 204 are expanded, and insertion and removal of PCI adapter cards is possible while allowing the system and the rest of the PCI I/O subsystem to remain powered and operational, via the use of in-line switch modules (not shown) in combination with the bus switch control logic 208 as explained hereinafter in connection with FIG. 3. Additional details regarding the expansion capabilities of the bus may be found in U.S. patent application Ser. Nos. 08/753,116 and 08/741,466.

Figure 3:
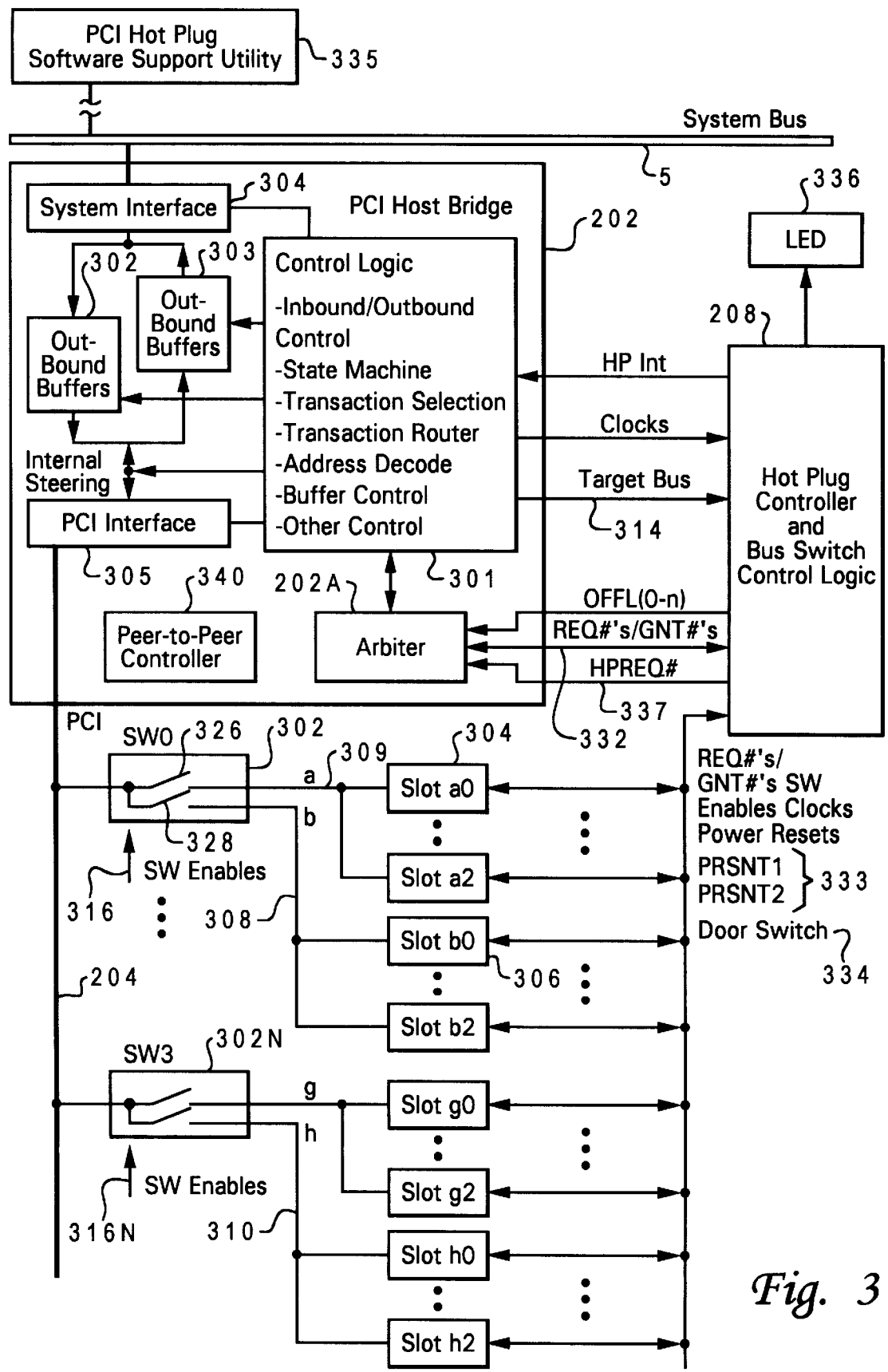
FIG. 3 is a block diagram illustrating in greater detail the configuration of PCI bus of FIG. 2 allowing the PCI adapter cards to be removed and inserted into PCI slots while allowing the system and all other PCI adapters to remain powered and operational and also allowing peer-to-peer transactions across bus segments.

Reference now being made to FIG. 3, a schematic diagram is shown illustrating in greater detail the configuration of PCI bus 204 of FIG. 2 for slot expansion and for insertion and removal of PCI adapter cards while allowing the system and PCI I/O subsystem to remain powered and operational according to the teachings of the present invention plus allowing peer-to-peer operations. The implementation of the invention as shown in FIG. 3 assumes that maximum loading of the PCI bus 204 is desired. It should be noted, therefore, and those of ordinary skill in the relevant art will readily recognize, that the teachings of the present invention are not limited to such an embodiment and are equally applicable to other combinations of switch modules and slots in which maximum loading is not so desired.

As shown in FIG. 3, in-line switch modules 302–302N are coupled to PCI bus 204. In-line switch module 302 is representative of switch modules 302–302N, and therefore, the explanation provided therewith is equally applicable to switch modules 302–302N. In-line switch module 302 includes two sets of switches as indicated by designations 326 and 328. Switches 326 and 328 are used for switching the appropriate PCI bus 204 signal lines, and when closed create two physically separate PCI compliant bus extensions (secondary PCI buses), as represented by designations "a" 309 and "b" 308, respectively. In the preferred embodiment in which maximum loading is desired, a total of four such switch modules are coupled to the PCI bus 204. One skilled in the relevant art, however, will readily recognize that the number of switch modules required for any particular application is dependent upon the number of switches contained therein.

These PCI bus extensions 308 and 309 can be coupled with either a slot or soldered component depending upon the desired configuration. In this particular embodiment, one slot is coupled to each PCI bus extension as illustrated by slot 304 (slot a0) and 306 (slot b0). Each of the slots are coupled to individual clock signals, power, switch enables signals, grant/request (GNT/REQ) 332, and reset signals. Additionally, PRSNT1 and PRSNT2 pins 333 and door switch 334 are coupled to the bus switch control logic 208 to identify whether an adapter is present and whether the slot door is opened or closed. If the slot door is opened on an occupied slot, this is an indication to bus switch control logic that the operator is initiating a removal of the card in that slot. Optionally, instead of providing the door switch for the operator to indicate initiation of a card removal, the operator could indicate this action via such a request to initiate a hot plug card removal at the keyboard. In either case, a PCI Hot Plug support software utility 335 would then initiate quiescing of the adapter to be removed, isolation of that adapter from the rest of the PCI bus, initiate powering down of that adapter, and indicate via an optional visual indicator such as LED 336 that adapter is ready to be removed (such as by flashing the LED).

Only one slot is illustrated in FIG. 3 under each switch to support a single power domain per PCI hot plug slot. One skilled in the art can see that multiple slots per power domain could also easily be supported and that, as fewer slots are provided under each set of switch modules, additional sets of switch modules can be added to achieve a maximum number of slots, and still meet the loading restrictions required by the PCI specification. As the in-line switch modules 302–302N are switched on and off, the PCI bus 204 is shielded from the load effects resulting therefrom via the bus switch control logic 208 and arbiter 202a of host bridge 202. In other words, as a set of switches, such as switches 326 and 328, are "opened," as determined by the bus switch control logic 208 and corresponding switch enable lines 316, the arbiter has granted the PCI bus to the Hot Plug Controller and Bus Switch Control Logic, so the load changes are hidden from the rest of the bus. The isolation (offline status) of the switches is made known to arbiter 202a via a plurality of signals OFFL(0–N), and isolates the powering up and powering down of a given adapter card.

This isolation is a direct result of the high impedance of the switches 302–302N from such an open state. In contrast, when a set of switches 302–302N are "closed," as determined by the bus switch control logic 208 and corresponding SW enable 316 lines, the respective PCI bus extensions appear as though they are an integrated portion of PCI bus 204. In the preferred embodiment of the present invention, the switch modules 302–302N have switches which can toggle between the open and closed states in less than a PCI clock cycle.

The time required for the Hot Plug Controller and Switch Control Logic to hold the bus for changing the state of a set of switches is only a few clock cycles. In general, arbiter 202a in conjunction with bus switch control logic 208 controls access to and from PCI bus 204 via any one of the in-line switch modules 302–302N. Thus, any communication with a device coupled to PCI bus 204, via one of the in-line switch modules 302–302N, is directed through the arbiter 202a and bus switch control logic 208 as explained hereinafter.

Figure 5:
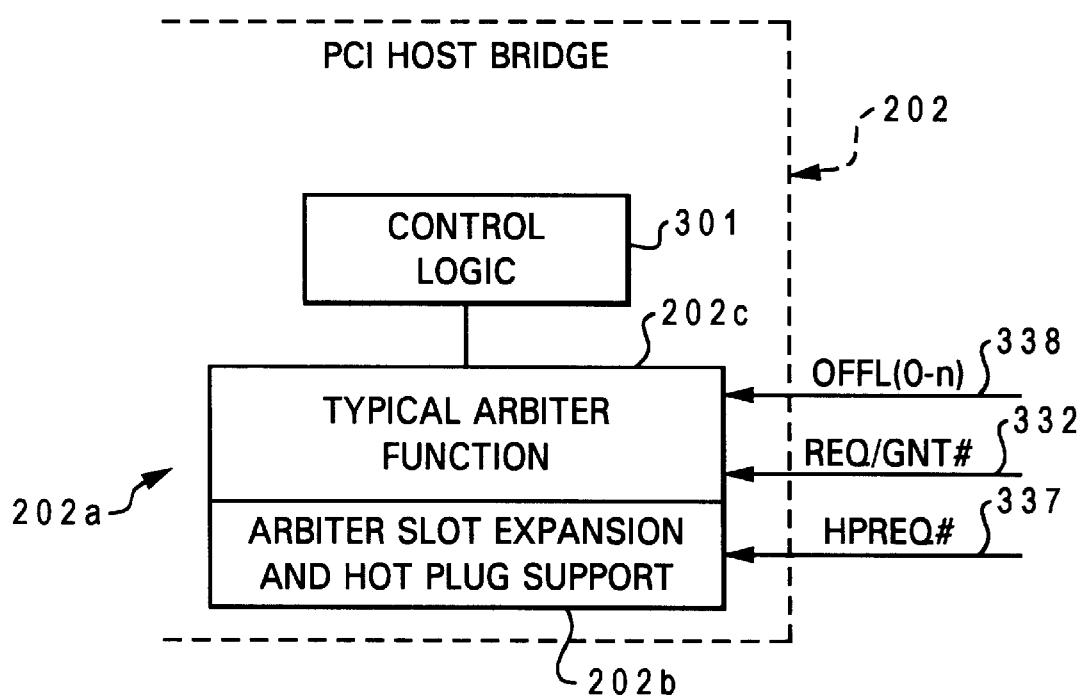
FIG. 5 is a block diagram illustrating added detail of the arbiter used in accordance with the present invention to support PCI slot expansion and PCI hot plug.

Referring now to FIG. 5, arbiter 202a includes added enhanced arbitration control logic 202b to support both PCI slot expansion and removal and insertion of PCI adapter cards while the system and the rest of the PCI bus remains powered and operational. Generally speaking, arbiter 202a provides arbitration for control over PCI bus 204. In the preferred embodiment of the present invention, arbiter 202a provides arbitration for up to 25 arbitrating units (e.g., 24 adapters and host bridge 202). The winning arbitrating unit, as determined by arbiter 202a, is referred to hereinafter as the "master." More or less than 24 arbitrating units could be supported dependent on the operating frequency planar layout and the number and combination of sets of in-line switch modules utilized. In FIG. 5, the typical arbitration function 202c provides the circuitry required to support arbitration on a PCI bus under a single PCI host bridge. Also included in the PCI arbiter according to the capability of this invention is added enhancement control logic for arbiter slot expansion and hot plug support 202b.

Hot plug controller and bus switch control Logic 208 is coupled to arbiter 202a via REQ/GNT lines 332, and encoded target bus lines 314. The REQ/GNT lines 332 are also used for granting the bus to a winning master and for granting momentary control (on the order of a few PCI clock cycles) of the PCI bus 204 to the hot plug controller and switch control logic to enable or disable the in-line switch modules 302–302N via the respective SW enable lines 316–316N. Arbiter 202a and bus switch control logic 208 use SW enable lines 316 to control which one of the in-line switch modules 302–302N to enable or disable.

Each one of the slots 304, and 306 include individual request and grant (REQ/GNT) lines 332 for requesting and receiving permission to control PCI bus 204. As noted in FIG. 3, each of these REQ/GNT lines pass through the bus switch control logic 208 to arbiter 202a.

The interaction between the arbiter 202a and bus switch control logic 208 is explained in detail by the following examples.

As previously explained, the bus switch control logic 208 is provided with the REQ/GNT lines 332 (separate request and grant lines) from arbiter 202a which are then routed to the various PCI slots (e.g., slot a0 304 and slot a2 306). Arbiter 202a provides arbitration for each of the PCI slots such that the slots and the host bridge 202 appear as if they all resided on the same logical bus.

Prior to passing a GNT# signal from the arbiter 202a to a new winning arbitrating unit and while there is no activity on the bus, the bus switch control logic 208 first opens and closes the appropriate switches, thus connecting and disconnecting the appropriate secondary PCI buses. In this manner, the bus switch control logic 208 performs the role of an agent for the winning arbitrating unit; in other words, it acts as if it owns the bus 204 momentarily prior to passing the GNT# signal to the designated device.

The above action of the bus switch control logic 208 does not violate the PCI architecture, as currently defined in version 2.1, in that the GNT# will be passed to the winning arbitrating unit in time for it to gain control of the bus.

Control logic 301, arbiter 202a and bus switch control logic 208 operate in conjunction with one another to determine and configure the state of the in-line switches 302–302N. The state of the switches 302–302N is based on where the target of the current transaction is located when the PCI bus 204 is granted by the host bridge 202. For example, if the host bridge 202 decides to perform an out-bound transaction on the PCI bus 204, then the host bridge 202 activates its REQ# signal and arbitrates for the PCI bus 204. Thereafter, control logic 301 determines, based on the address of the out-bound transaction and the address assigned to the host bridge 202, where the target of the transaction is located. If the host bridge 202 wins the bus arbitration, then the GNT# line for the previous owner of the PCI bus 204 is deactivated, and host bridge 202 is granted access to PCI bus 204. The GNT# signal is then passed to the bus switch control logic 208 via REQ/GNT lines 332.

The following description is an example of a sequence used by the preferred embodiment of the present invention for connecting an appropriate slot (e.g., 304 and 306) to PCI bus 204, and assumes that the adapter (not shown in FIG. 3) residing in slot h0 (on secondary PCI bus h 310) is the current owner of PCI bus 204, and is performing transfers to system memory (not shown in FIG. 3). Consequently, in-line switch 302N to secondary PCI bus h 310 is closed. If the master slot a0 304, residing on secondary PCI bus a 309, requests control over of PCI bus 204, the GNT# signal for the current owner will be deactivated (i.e., slot h0), and the adapter residing therein finishes any remaining transfers and relinquishes control of the bus 204. Arbitration as previously described normally occurs as a background operation while the current bus owner completes its transfers.

In this example, it is further assumed that the device residing in slot a0 304 on bus a 309 wins the arbitration. Consequently, control of PCI bus 204 is granted to the device residing in slot a0 304 (i.e., the a0 304 GNT# signal is routed to the bus control switch logic 208). As a result of winning the arbitration, bus switch control logic 208 realizes that the device adapter residing in slot a0 304 is being granted access to PCI bus 204. As a result, bus switch control logic 208 delays the routing of the GNT# signal to slot a0 304 until the in-line switches 302–302N to the previous bus 204 owner are opened, and the switches to the new bus owner are closed, via the enablement or disablement of the appropriate SW Enables 316. Bus switch control logic 208 then routes the GNT# signal to the device residing in slot a0 304 on bus a 309, which is then allowed to perform its operation.

If host bridge 202 now desires to perform a transfer to a target device residing at slot b0 on bus b 308, host bridge 202 will request control of PCI bus 204. Assuming that the host bridge 202 wins the arbitration cycle, the device residing in slot a0 on bus a 309 detects the removal of its GNT# signal, and therefore concludes it operation and proceeds to relinquish control of the bus 204. Address decode logic, residing in control logic 301, indicates that the target to be selected resides in slot b0 on bus b 308. Consequently, an encoded set of signals on target bus 314 are sent to the bus switch control logic 208 to indicate the secondary PCI bus the target resides on (i.e., 308). When the host bridge 202 is granted control over the bus, bus switch control logic 208 first opens the switches 302–302N to the previous owner (slot a0 304), closes the switches 302–302N to the target on bus b 308, and then routes the GNT# signal back to the host bridge 202.

Figure 4:
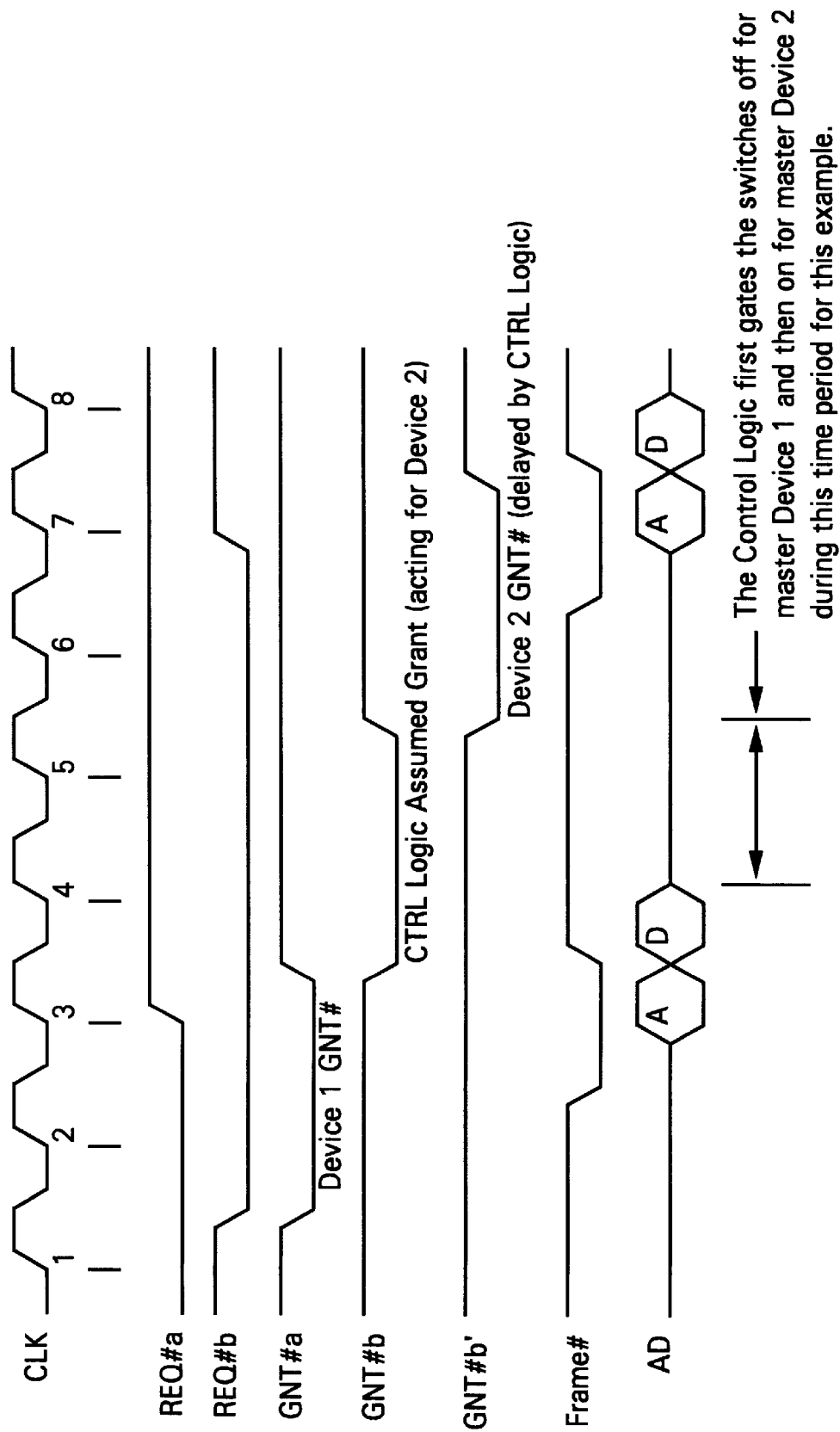
FIG. 4 is a timing diagram illustrating an example of a set of timing sequences for the release and grant of the PCI bus of FIG. 3 according to the present invention.

Reference now being made to FIG. 4, a timing sequence diagram is shown which illustrates an example of a set of timing sequences for the release and grant of PCI bus 204 according to the teachings of the present invention. More specifically, the timing sequence illustrated in FIG. 4 shows an example in which the PCI bus 204 is being released by a first device (device 1), and granted to a second device (device 2). As previously, explained, the bus switch control logic 208 first gains momentary control over the PCI bus 204 on behalf of the new winning arbitrating unit, in order to first open and close the appropriate in-line switches 302–302N before routing the new GNT# signal to the new winning arbitrating unit.

Current loading restrictions imposed by the PCI specification limit slots to a total of four. However, with the teachings of the present invention a total of 24 slots can be attached under one host bridge, while maintaining conformance to the loading requirements of the PCI specification for 33 MHz. It should also be noted that the present invention is equally applicable to a PCI bus operating at 66 MHz. Specifically, the loading restrictions for a 66 MHz limit the use of slots to a total of two. The teachings of the present invention, as applied to the PCI 66 MHz bus, allow up to a maximum of four slots.

Again referring to FIG. 3, when a PCI hot plug action is initiated via the slot door switch or via input request from the keyboard for an adapter in, say, slot a0 304, PCI hot plug support software utility 335 in conjunction with the operating system will then quiesce the adapter, and the bus switch control logic initiates its own arbitration request by driving the HPREQ# arbitration line 337 connected to arbiter 202a. When the bus switch control logic is momentarily granted the bus, in-line switch module 336 is opened isolated that slot from the rest of the PCI bus. The bus switch control logic then powers down the adapter card, and indicates via the visual indicator 336 that it is acceptable to remove the adapter card. Ramping down the power to the slot may be performed as taught in U.S. patent application Ser. No. 08/552,035, which is hereby incorporated.

After the adapter card previously removed from slot a0 304 has been replaced and installed into the slot 304 and the operator has indicate they are ready to configure the card, by closing the slot door or by indicating via input from the keyboard, PCI hot plug support software utility 335 initiates the power-up sequence by signalling to bus switch control logic 208 to power-up the card. Bus switch control logic 208 then powers-up the card, and drives its request line 337 connected to arbiter 202a to arbitrate for the bus, and when it obtains the bus, closes the set of in-line switch modules 304 to place the slot back on-line, and releases the bus. One skilled in the art can see that a new adapter not previously installed in the system, or a replacement adapter different from the one removed can be similarly installed in an empty slot in the same manner, if the PCI hot plug support software utility 335 is adapted to handle the addition of a new adapter card not previously installed in the system, or replacement of an adapter removed with a different adapter.

In order to allow peer-to-peer communications between devices on the bus, host bridge 202 can act as an agent for the controlling master on the bus. This feature can be accomplished by providing peer-to-peer control logic 340 to allow PCI host bridge 202 to respond to all accesses (addresses) as if it were always the target. An exception might be allowed for addresses targeted for any PCI—PCI bridge under host bridge 202. Since the primary purpose of the in-line switches is to provide slot expansion and/or slot isolation for hot plug, this possible exception generally does not occur.

To support peer-to-peer communications, host bridge 202 accepts all accesses as the target on the bus regardless of the address. If the host bridge is not the real target, the bridge buffers the transaction, and arbitrates later for the bus. Then, as controlling master (as an agent for the real master), the host bridge puts the access back out on the same bus.

Host bridge 202 uses the same look ahead logic to determine where the target is prior to arbitrating for the bus. Host bridge 202, arbiter 202a, and bus switch control logic 208 work together to close the appropriate switches making available the correct target once the bridge is granted the bus. If the host bridge were actually the real target in the original access, the bridge would handle that access as a normal target.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of providing PCI slot expansion on a PCI bus of a computer system, said method comprising the steps of:
    connecting a bridge to a system bus of said computer system;
    connecting a primary peripheral bus to the bridge;
    connecting one or more peripheral devices to a respective one or more peripheral slots of a secondary peripheral bus;
    controlling access by said one or more peripheral devices to and from the primary peripheral bus by using an arbiter to select a master from among the one or more peripheral devices; and
    in response to the selection of the master, selectively establishing a connection from the primary peripheral bus to the secondary peripheral bus while ensuring compliance with a bus loading threshold of said primary peripheral bus.

2. The method of claim 1, further comprising the step of transferring data between the master and the bridge.

3. The method of claim 1, further comprising the step of transferring data between the master and a peripheral device via the primary peripheral bus.

4. The method of claim 1, further including the step of providing additional secondary buses, and wherein said controlling step includes the steps of:
    opening at least one switch to one of the additional secondary peripheral buses using bus switch control logic to ensure said compliance with said bus loading threshold is maintained; and
    closing a switch to the secondary peripheral bus that is connected to the master using the bus switch control logic.

5. The method of claim 4, further comprising the steps of:
    detecting removal of a request grant signal of a peripheral device on the other one of the secondary peripheral buses; and
    concluding a data transfer operation of the peripheral device on the other one of the secondary peripheral buses.

6. The method of claim 1, wherein said isolating of the master includes the steps of:
    isolating one of said one or more peripheral slots of said secondary bus; and
    inserting the peripheral device into the slot that is isolated.

7. The method of claim 6 wherein said isolating of the master includes the further steps of:
    applying a reset signal to the slot, after said inserting step; and
    initializing the selected peripheral device following release of the reset signal.

8. A computer system comprising:
    a system bus;
    a memory device connected to said system bus;
    processor means, connected to said system bus, for carrying out program instructions stored in said memory device;
    a bridge connected to said system bus;
    a primary peripheral bus connected to said bridge;
    at least one secondary peripheral bus, having one or more slots for receiving peripheral devices;
    one or more peripheral devices connected to slots of said at least one secondary peripheral bus; and
    an arbiter that controls access to and from said primary peripheral bus by selecting a master from among said one or more peripheral device and selectively establishes a connection from said primary peripheral bus to said secondary peripheral bus in response to said selection of said master, while ensuring compliance with a bus loading threshold of said primary peripheral bus.

9. The computer system of claim 8, further comprising means for transferring data between said master and said bridge.

10. The computer system of claim 8, further comprising means for transferring data between said master and a peripheral devices connected to the primary peripheral bus via said primary peripheral bus.

11. The computer system of claim 8, wherein:
    said at least one secondary peripheral bus includes a first secondary peripheral bus to which said master is connected and a second secondary peripheral bus; and
    said computer system further comprises bus switch control logic for opening a switch to said second secondary peripheral bus and for closing a next switch to said first secondary peripheral bus.

12. The computer system of claim 11, further comprising means for allowing a peripheral device on said second secondary peripheral buses to detect removal of a request grant signal.

13. The computer system of claim 12, wherein said arbiter includes means for isolating a given slot from a respective one of said at least one secondary peripheral bus before inserting a peripheral device in said slot.

14. The computer system of claim 13 further comprising:

means for applying a reset signal to said slot after the peripheral device has been inserted in said slot; and means for initializing said peripheral device following release of said reset signal.

15. The computer system of claim 8, further comprising:

a plurality of in-line switch modules coupled between said primary peripheral bus and each of said at least one secondary peripheral buses; and bus switch control logic coupled to said bridge and said primary peripheral bus that controls said primary peripheral bus to allow selective loading via connection to and disconnection from peripheral adapter cards of said secondary peripheral buses via said plurality of in-line switch modules to maintain a maximum loading threshold of said primary peripheral bus.

16. The method of claim 1, further comprising the step of isolating the master prior to connecting said master to the secondary peripheral bus.

17. The method of claim 4, further comprising the step of monitoring a bus loading of said primary peripheral bus; and maintaining said bus loading at or below said bus loading threshold of said primary peripheral bus by selectively opening a switch connecting one of said additional secondary peripheral buses in response to said loading approaching said bus loading threshold.

18. The method of claim 1, further comprising the step of coupling a switch between each one of said plurality of secondary peripheral buses and said primary peripheral bus, wherein said switch is closed to allow communication between said master and said primary peripheral bus in response to said master being selected.

19. A computer system comprising:

a system bus;

a memory device connected to said system bus;

processor means, connected to said system bus, for carrying out program instructions stored in said memory device;

a bridge connected to said system bus;

a primary peripheral bus connected to said bridge;

at least one secondary peripheral bus having a plurality of slots for connecting peripheral devices, wherein a number of said plurality of slots and slots of said primary peripheral bus produces greater loading than is supported by said primary peripheral bus;

one or more peripheral devices connected to one or more of said plurality of slots;

circuit means for selectively coupling and de-coupling said plurality of secondary peripheral buses to said primary peripheral bus;

an arbiter for selecting one of said peripheral devices as a master;

bus switch control logic connected to said arbiter and said circuit means that selects particular ones of said at least one secondary peripheral bus to couple to and de-couple from said primary peripheral bus to provide access by said master while maintaining a loading requirement of said primary peripheral bus.

20. The computer system of claim 19, wherein said circuit means includes in-line switches.

21. The method of claim 1, comprising the step of:

opening a switch associated with a slot of said primary peripheral bus in response to detection of a connection of said primary peripheral bus to a secondary peripheral bus having a load, which in combination with a load of the primary peripheral bus exceeds the threshold loading for the primary peripheral bus, whereby compliance with the bus loading threshold is ensured.

* * * * *